(12) United States Patent
Ware et al.

(10) Patent No.: US 7,010,396 B2
(45) Date of Patent: Mar. 7, 2006

(54) IRRIGATION CONTROLLER WITH EMBEDDED WEB SERVER

(76) Inventors: David Brent Ware, 1908 N. Airport Dr., Lehi, UT (US) 84043; Daniel Scott Ware, 910 E. 2180 N., Lehi, UT (US) 84043

( * ) Notice: Subject to any disclaimer, the term of this patent is extended or adjusted under 35 U.S.C. 154(b) by 30 days.

(21) Appl. No.: 10/818,623

(22) Filed: Apr. 5, 2004

(65) Prior Publication Data

US 2004/0236443 A1    Nov. 25, 2004

Related U.S. Application Data

(60) Provisional application No. 60/459,911, filed on Apr. 4, 2003.

(51) Int. Cl.
*G05D 11/00* (2006.01)
*G05D 7/00* (2006.01)

(52) U.S. Cl. .......................... 700/284; 700/19; 700/65; 702/188; 709/203; 709/206; 709/219

(58) Field of Classification Search ................. 700/19, 700/65, 284; 405/36, 37; 239/722, 723; 137/78.1–78.3; 702/188; 709/203, 206, 709/219
See application file for complete search history.

(56) References Cited

U.S. PATENT DOCUMENTS

| 5,229,937 | A | * | 7/1993 | Evelyn-Veere | 700/284 |
|---|---|---|---|---|---|
| 5,740,031 | A | * | 4/1998 | Gagnon | 700/16 |
| 5,805,442 | A | | 9/1998 | Crater et al. | 364/138 |
| 5,853,122 | A | * | 12/1998 | Caprio | 236/44 C |
| 5,936,362 | A | * | 8/1999 | Alt et al. | 315/312 |
| 6,201,996 | B1 | | 3/2001 | Crater et al. | 700/9 |
| 6,282,454 | B1 | | 8/2001 | Papadopoulos et al. | 700/83 |
| 6,289,378 | B1 | | 9/2001 | Meyer et al. | 709/223 |
| 6,405,099 | B1 | | 6/2002 | Nagai et al. | 700/159 |
| 6,453,216 | B1 | * | 9/2002 | McCabe et al. | 700/284 |
| 6,484,061 | B1 | | 11/2002 | Papadopoulos et al. | 700/83 |
| 6,518,980 | B1 | | 2/2003 | DeMotte et al. | 345/762 |
| 6,567,863 | B1 | | 5/2003 | Lafuite et al. | 710/8 |
| 6,600,971 | B1 | | 7/2003 | Smith et al. | 700/284 |
| 6,603,488 | B1 | | 8/2003 | Humpleman et al. | 345/771 |
| 6,640,140 | B1 | | 10/2003 | Lindner et al. | 700/18 |
| 6,823,239 | B1 | * | 11/2004 | Sieminski | 700/284 |
| 6,891,838 | B1 | * | 5/2005 | Petite et al. | 370/401 |
| 2003/0005099 | A1 | | 1/2003 | Sven et al. | |

(Continued)

*Primary Examiner*—Anthony Knight
*Assistant Examiner*—Crystal J Barnes
(74) *Attorney, Agent, or Firm*—Steve McDaniel; Scott Raevsky (57) ABSTRACT

An irrigation controller with an embedded web server activates irrigation devices in accordance with an event schedule. The event schedule maybe accessed and modified via a browser-equipped client. In certain embodiments, watering rates and schedules are adjusted in response to sensor inputs. The controller may query specialized network servers such as time servers or weather servers to update the controller clock and/or modify the event schedule. The controller may support multiple protocols such as email, FTP, UDP, HTTP and the like. The controller may be configured as a master or slave controller such that multiple slave controllers may coordinate with a master controller and modify their event schedules in accordance with the master event schedule. The result is an irrigation controller that is easily configured, locally or remotely accessible, responsive to varying weather conditions, and suitable for complex multi zone, multi-system configurations.

37 Claims, 4 Drawing Sheets

U.S. PATENT DOCUMENTS

2003/0025400 A1 * 2/2003 Hall
2003/0126295 A1 * 7/2003 Doherty ...................... 709/249
2003/0179102 A1 * 9/2003 Barnes
2003/0182022 A1 * 9/2003 Addink et al.
2003/0217100 A1 * 11/2003 Kronk ....................... 709/203
2004/0181315 A1 * 9/2004 Cardinal et al.

* cited by examiner (Prior Art)

Fig. 1

(Prior Art)

IRRIGATION CONTROLLER WITH EMBEDDED WEB SERVER

RELATED APPLICATIONS

This application claims the benefit of U.S. Provisional Patent Application No. 60/459,911 entitled "Browser-based schedule controller for electrical devices" and filed on Apr. 4, 2003 for David Brent Ware.

BACKGROUND OF THE INVENTION

1. Field of the Invention

The invention relates to automated control of irrigation devices. More particularly, the invention relates to an irrigation controller with an embedded web server.

2. Description of the Related Art

Irrigation controllers are used to control the delivery of water to watering devices such as sprinkler heads and driplines. Controllers are typically configured to deliver water to sets of sprinklers arranged in watering zones to ensure that the sprinklers are provided with adequate water pressure. Watering by zones also permits each zone to be watered at different frequencies, durations, and times. Irrigation controllers control delivery of water to each set of the sprinklers by actuating the irrigation valves in a predetermined or selected sequence to accomplish the irrigation process.

A wide variety of controllers are commercially available for controlling the automatic operation of irrigation sprinklers in residential, industrial, and agricultural applications. These controllers vary in complexity and cost all the way from single-station, battery-powered units with few programming options that are mounted directly on a water valve, to complex, computer-based units capable of operating a complex irrigation system with many stations that require different operating parameters.

Figure 1:
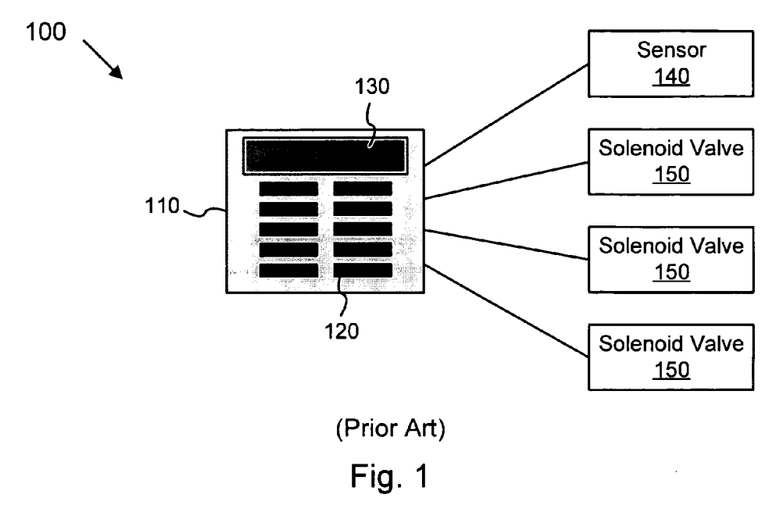
FIG. 1 is a schematic block diagram illustrating a prior art stand-alone irrigation system.
Figure 2:
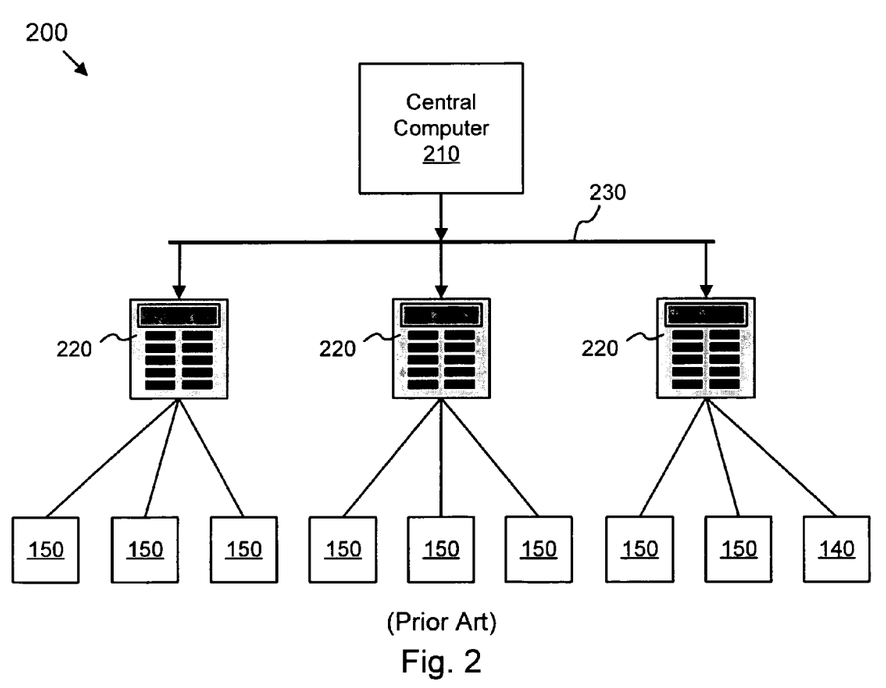
FIG. 2 is a schematic block diagram illustrating a prior art centrally controlled system.

Two significant types of control systems used for landscape irrigation are depicted in FIGS. 1 and 2. FIG. 1 depicts a traditional stand-alone controller system 100 while FIG. 2 depicts a centralized control system 200.

Referring to FIG. 1, the depicted stand-alone controller system 100, which is typically wall mounted and used for smaller irrigation sites with four (4) to forty eight (48) irrigation devices, includes a controller 110 with user interface elements such as a keypad 120 and a liquid crystal display 130. With the user interface elements, a user can set up automatic watering programs, perform manual watering, and perform additional functions for irrigation control.

In the depicted example, the stand-alone controller 110 connects to one or more sensors 140 and irrigation solenoid valves 150. The sensors 140 may monitor multiple variables such as amount of rainfall, water flow, and power consumption. The sensors 140 provide such data to the stand-alone controller 110. The depicted stand-alone controller system 100 also includes a plurality of solenoid valves 150. Each solenoid valve 150 may control the flow of water to a particular watering zone.

Typically, the stand-alone controller 110 provides control signals to the solenoid valves 150 and may receive one or more sensor signals from the sensors 140 that provide input to various programmable features. Generally, such controllers tend to be difficult to set up or program in that the interface elements tend to be quite limited in functionality—particularly in cost sensitive installations. Additionally, in larger installations multiple stand-alone controllers must be used because the distance between the controller and valve stations is limited by a maximum amount of tolerable wiring impedance. Sites that utilize multiple stand-alone controllers are typically difficult to maintain in that the controllers must be individually programmed at their particular installation location.

FIG. 2 depicts an alternative to multiple stand-alone controllers 110, namely the centralized control system 200. As depicted, the centralized control system 200 includes a central computer 210 connected to a plurality of satellite controllers 220 which are in turn are connected to a number of solenoid valves 150. The centralized control system 200 generally includes various sense and/or control devices linked together via a communication channel 230.

The centralized control methodology depicted in FIG. 2 facilitates managing of large sites or multiple sites from a single location. A typical installation will contain multiple field controllers, or satellites 220, one or more sensors 140, and a single central control center containing a central computer 210.

The satellite controllers 220 are typically field devices, similar to the stand-alone controllers 110 that offer both valve control and various sensor interfaces. More sophisticated satellites also have a user interface for local programming. A major difference between the satellite controller 220 and the stand-alone controller 110 is the communication channel 230. The communication channel 230 interface allows the satellites 220 to communicate with the remote central computer 210. The type of medium used by the communication channel 230 varies depending on the requirements of each individual site. Typical centralized systems use twisted pair wire, radio modems, analog telephone modems, wireless communications (RF, VHF, UHF, microwave), fiber optics, power lines, telephone cables, cellular telephones, infrared, wireless pager systems, or television cables to carry the communication channel 230.

In managing large installations, the centralized system 200 has some advantages over using multiple stand-alone controllers. For example, the centralized system 200 significantly reduces the manpower and level of effort required to maintain a large installation. Problems at a satellite location can be instantly reported to the central computer. Also, complex watering schedules can be realized, such as those based on evapotranspiration, by utilizing the computer's graphical display and processing capabilities.

Despite the advantages of the centralized system, several problems and challenges still exist with such systems. The cost of a centralized system may be very high due to the dedicated equipment involved. For example, in a smaller site consisting of 5–10 satellite controllers, the costs associated with operating and maintaining a central computer may not be affordable, even though a centralized solution is preferred. Additionally, there is often a large and difficult learning curve for a system operator to fully understand and utilize the capabilities of the system. Moreover, the satellite controllers are generally simple receivers that can only communicate when specifically addressed by the central computer.

Given the aforementioned alternatives, a need exists for an irrigation controller containing an embedded web server that supports communication with a browser-equipped client such as a personal computer, PDA, or cell phone. Multiple irrigation controllers distributed in several locations may then be programmed from any authorized client that communicates via the internet or similar network means resulting in a graphically rich interface to the user. Beneficially, such an irrigation controller would simplify entry and maintenance of irrigation schedules, and facilitate distributed arrangements of master controllers and satellite controllers that coordinate with one another and communicate through the use of web pages and email. Preferably, such a controller would also be able to query a time server and thereby maintain an accurate time, and query a weather server and adjust the watering schedule in response to local weather conditions.

SUMMARY OF THE INVENTION

The present invention has been developed in response to the present state of the art, and in particular, in response to the problems and needs in the art that have not yet been fully solved by currently available irrigation controllers. Accordingly, the present invention has been developed to provide an irrigation control apparatus, system, and method that overcome many or all of the above-discussed shortcomings in the art.

The irrigation control apparatus of the present invention is provided with a logic unit containing a plurality of modules configured to control a variety of irrigation devices. In the described embodiments, these modules include a scheduling module, a clock module, and a interface module. In addition, the logic unit contains a plurality of modules configured to facilitate remote or local configuration of the apparatus including a serving module, and a communications module.

The scheduling module manages an event schedule containing a list of events and one or more time parameters associated with each event. The scheduling module initiates execution of the events of the event schedule in conjunction with a current time maintained by the clock module. A variety of devices connected to the device device interface module may be activated by the scheduling module including irrigation valves and other low voltage relays, pumps and other high voltage relays, X10 devices, thermostat controllers, and the like.

The scheduling module may modify the event schedule in response to sensor values received from the device device interface module as well as information received from a network server or a browser-equipped client. The scheduling module may also coordinate with a master controller and/or query specialized servers such as time servers or weather servers and adjust or modify the event schedule in response to the received information.

The serving module may exchange streams of data wit hone or more browser-equipped clients. The serving module may respond to a client request by serving one or more web pages via the communications module. The served pages are configured to provide a highly functional graphical interface and enable the client to configure the controller and change the event schedule. The serving module may also service requests using other common internet protocols supported by the communications module such as file transfer protocol (FTP), user datagram protocol (UDP) and post office protocol (POP), and the like. The serving module may also prevent data interchange with an unauthorized client.

In one embodiment, the irrigation control system of the present invention includes the above-described irrigation control apparatus as well as a network that facilitates communication with one or more browser-equipped clients and at least one irrigation device such as a solenoid valve, a pump, or the like. The system may also include one or more sensors such as moisture sensors, temperature sensors, or the like. The irrigation control apparatus maintains an event schedule that lists events and associated times to perform the events. Authorized browser-equipped clients may modify the event schedule via the network.

In one embodiment, the irrigation control method of the present invention includes activating one or more irrigation devices in accordance with an event schedule, and serving one or web pages that enable a browser-equipped client to change the event schedule. The method may also include reading one or more sensors and modifying the event schedule based on the sensor values. The method may query a master controller or specialized network servers such as a time server or a weather server, and may modify an internal clock or the event schedule based upon the information.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present invention sets forth an apparatus, system and method for controlling and configuring an irrigation system using an embedded web server. The invention may be embodied in a system with one or more browser-equipped clients, one or more irrigation controllers, each with an embedded web server, and a communication network. Additionally, specialized servers that provide time parameters and weather parameters may be utilized in conjunction with the operation of the irrigation controllers.

Figure 3:
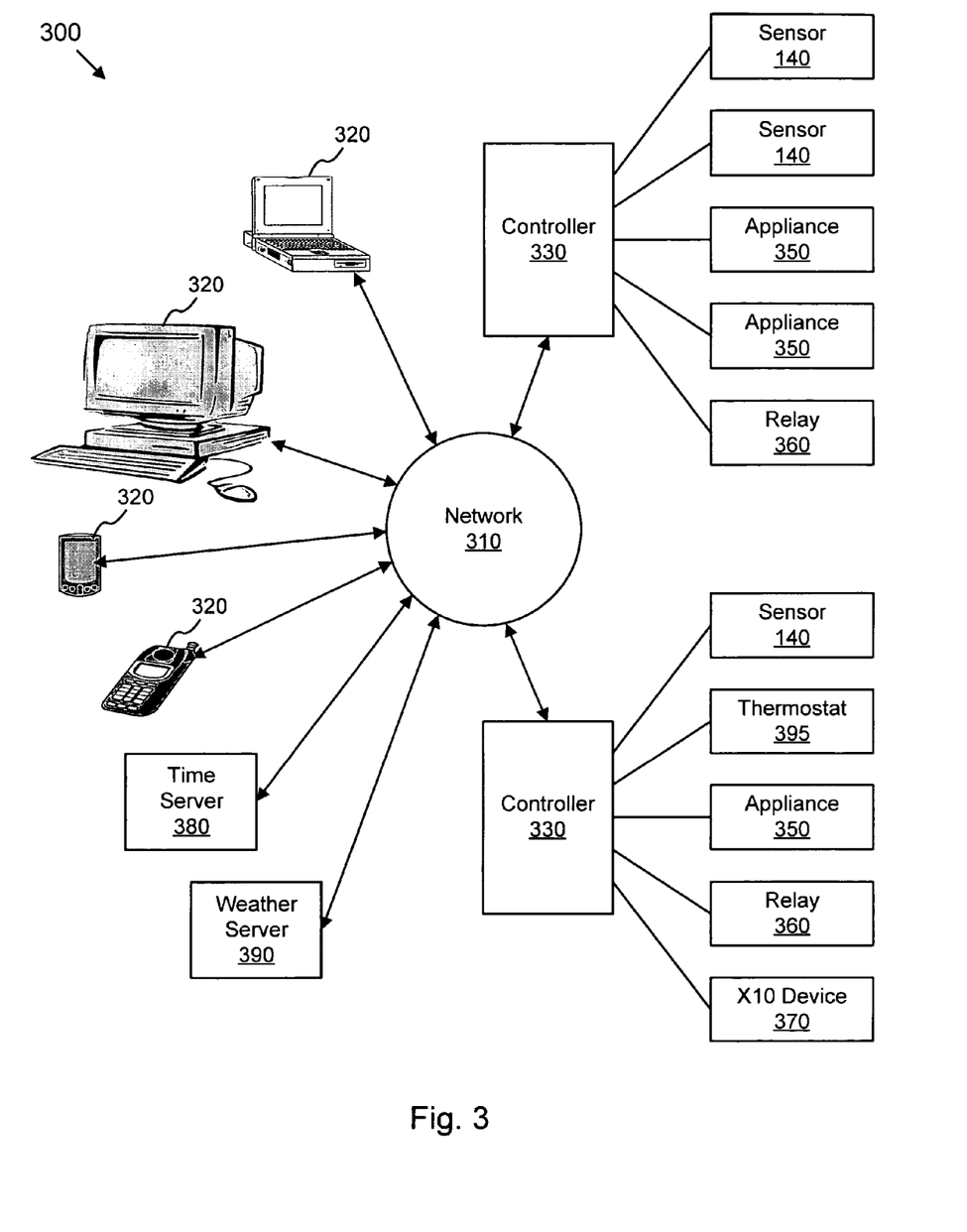
FIG. 3 is a schematic block diagram illustrating one embodiment of an irrigation control system of the present invention.

FIG. 3 is a schematic block diagram illustrating one embodiment of an irrigation control system of the present invention. The depicted irrigation control system 300 includes a computer network 310, one or more browser-equipped clients 320 such as a portable computer, a desktop computer, a personal digital assistant (PDA), or a cell phone, one or more programmable controllers 330, each controller connected to one or more irrigation devices 350. Additionally each controller 330 may be connected to one or more sensors 140, one or more relays 360, one or more thermostats 395, and/or one or more X10 devices 370. Optionally, specialized servers such as a time server 380 and a weather server 390 may be accessed via the network 310.

The network 310 provides communication between a browser-equipped client 320 and the programmable controller 330. The network 310 may be physically implemented using various technologies such as Ethernet, wireless transmission, telephone lines, or a power line network bridge. The network may be for example, a local area network (LAN), wide area network (WAN), or the Internet. The network 310 may communicate information through use of protocols such as transmission control protocol (TCP), internet protocol (IP), file transfer protocol (FTP), user datagram protocol (UDP), hyper-text transfer protocol (HTTP), secure hyper-text transfer protocol (SHTTP), and post office protocol (POP). In one embodiment, the controller 330 appears as a continuously active Internet node. The controller 330 may employ communication security features to prevent data interchange with an unauthorized client.

In one embodiment, the controller 330 contains a microprocessor and a non-volatile memory with an event schedule stored therein. The event schedule may include a list of actions and a corresponding list of time parameters. For example, an entry in the event schedule may designate that a selected irrigation solenoid valve be activated at a selected time for a selected duration.

The controller 330 activates the irrigation devices 350 in accordance with the event schedule. The controller 330 also contains an embedded web server that serves one or more web pages (not shown) to the browser-equipped client(s) 320. Each web page may contain one or more fields that may be modified through interaction with the client 320. The controller 330 may change the event schedule in response to a change in the one or more web page modifiable fields.

The controller 330 may also be connected to one or more sensors 140; the sensors measuring attributes such as soil moisture, humidity, water pressure, temperature, liquid level, voltage, light level, and the like. The controller 300 may modify the event schedule in response to the sensor values. For example, if a moisture sensor indicates that the soil is wet, an irrigation event may be delayed. Similarly, if a temperature sensor indicates that the temperature exceeds a selected value an irrigation event duration may be extended.

Since the controller 330 may be located in a remote location such as a pump house, the controller 330 may be conveniently used to provide other sensory information. For example, a sensor may be employed to monitor a pump parameter such as water pressure, or if a material such as a pesticide or fertilizer is added to the irrigation water, a sensor may be employed to monitor a liquid level. In one embodiment, the controller may activate one or more high voltage relays, such as a relay to turn on a pump. In another embodiment, the controller may interface to an X10 transmitter that uses the power grid as a network to activate one or more X10 compatible devices 370. In one embodiment, the controller may control a thermostat 395 such as a heating thermostat used to prevent water from freezing or to maintain a selected environmental air temperature.

In one embodiment, the controller 330 includes an FTP server used to transfer files such as upgrade files, configuration files, and the like. The controller may also include a POP server in order to send and receive email messages containing sensor readings, error messages, event schedule changes, and so forth.

The controller 330 may include an internal clock that is used in association with the event schedule to activate devices, relays, and the like. The controller 330 may query a time server 380 using internet protocols to obtain an accurate time value, and use the time value to update the internal clock. In a like fashion, the controller 330 may query a weather server 390 using internet protocols to obtain a weather parameter such as temperature, wind velocity and direction, humidity, and the like and use the weather parameter to modify the event schedule.

The controller 330 may be configured as a master controller or a slave controller. A slave controller may coordinate with the master controller using internet protocols and modify the local event schedule as a result of that coordination. For example, if a user changes the master event schedule located in the master controller to conform to a new watering schedule, the slave controllers may obtain the revised master event schedule and make corresponding changes to their local event schedule. Use of this feature simplifies the coordination of multiple irrigation zones spread across a plurality of irrigation controllers.

Figure 4:
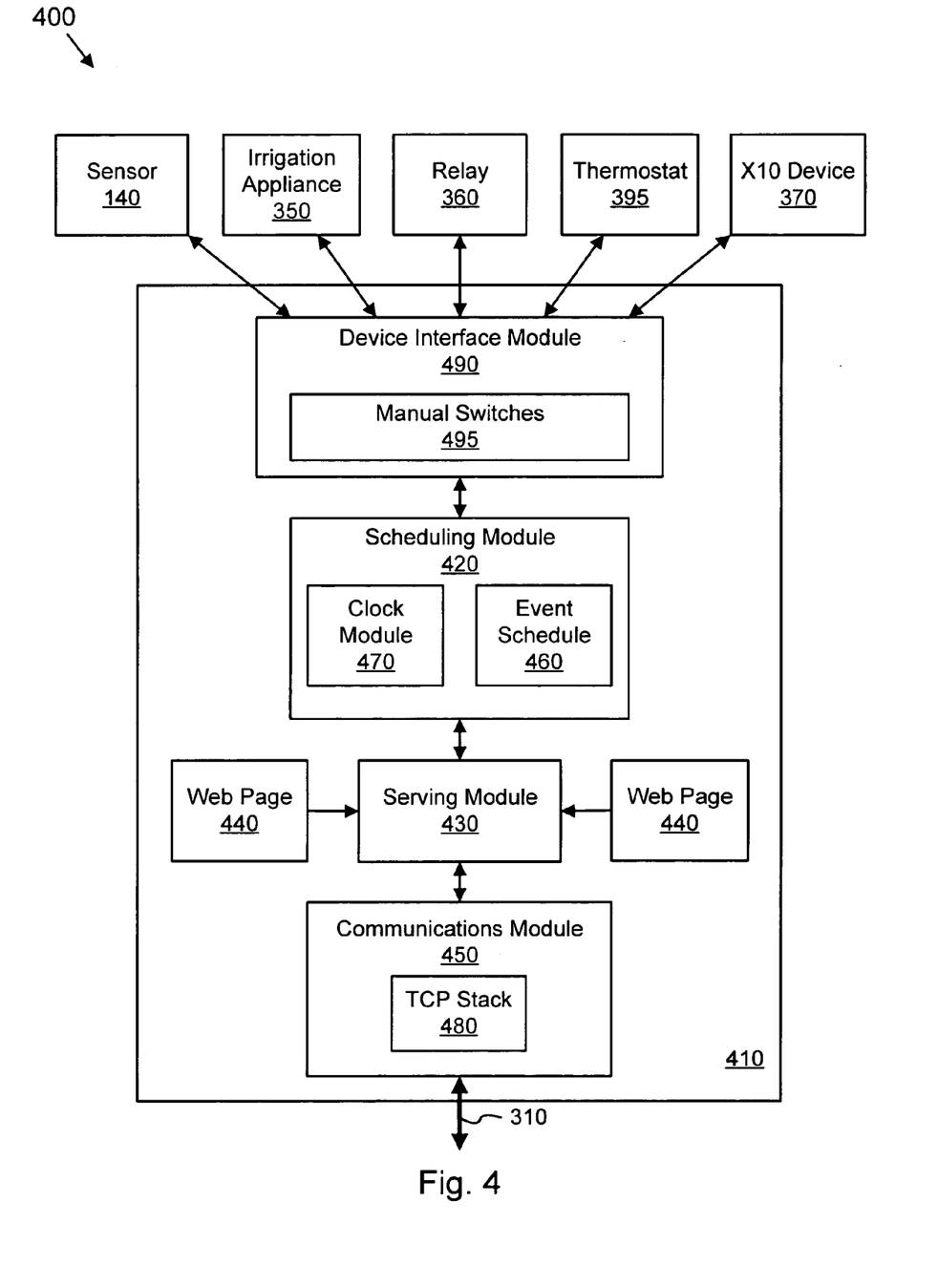
FIG. 4 is a schematic block diagram illustrating one embodiment of an irrigation control apparatus of the present invention.

FIG. 4 is a schematic block diagram illustrating one embodiment of an irrigation control apparatus of the present invention. The depicted irrigation controller 400 includes an irrigation controller assembly 410 with a scheduling module 420, a serving module 430, and one or more web pages 440. The depicted controller 400 also includes a communications module 450 that connects to the network 310 and a device interface module 490. The device interface module 490 connects to one or more irrigation devices 350, and may connect to one or more relays 360, thermostats 395, and/or X10 devices 370. In one embodiment, the interface module 490 also connects to one or more sensors 140.

The irrigation controller assembly 410 may incorporate a microprocessor (not shown), random access memory (not shown), and non-volatile memory (not shown), as well as other electronic components. The one or more web pages 440, a copy of an event schedule 460, the serving module 430, and other elements of executable code and data may be stored in the non-volatile memory.

The scheduling module 420 includes an event schedule 460, the event schedule which in one embodiment includes a list of actions and a corresponding list of time parameters. For example, an entry in the event schedule might indicate a selected time and duration to actuate a specified irrigation solenoid valve. The depicted scheduling module 420 also includes a clock module 470 that tracks the current time.

The scheduling module 420 activates the one or more irrigation devices 350 in accordance with the event schedule 460 and the time maintained in the clock module 470. In one embodiment, the scheduling module 420 determines an expected time of sunrise and sunset, and may modify the event schedule 460 in response to the expected sunrise and sunset times.

The device interface module 490 may be connected with a variety of external devices such the sensors 140, irrigation devices 350, relays 360, thermostats 395 and X10 devices or transmitters. In some embodiments, the scheduling module 420 (via the device interface module 490) may activate one or more high voltage relays, such as a relay to turn on a pump. In certain embodiments, the device interface module 490 may connect to an X10 transmitter that uses the power grid as a control network to activate one or more X10 compatible devices 370. In some embodiments, the scheduling module 420 may control a thermostat 395 such as a heating thermostat used to prevent water from freezing or maintain a selected indoor temperature.

The device interface module 490 is optionally connected to one or more sensors 140, the sensors measuring attributes such as soil moisture, humidity, water pressure, temperature, liquid level, voltage, light level, and the like. In one embodiment, the device interface module 490 reads a sensor signal and communicates the sensor value to the scheduling module 420. The scheduling module 420 may modify the event schedule 460 in response to the sensor 140 values. The device interface module 490 may manage a log of sensor values and may further average sensor values to improve the accuracy of a selected class of sensors.

In certain embodiments, the device interface module 490 includes a set of manual switches 495 that may be used to manually control external devices. In one embodiment, one of the switches is a "manual mode" switch that activates a manual mode for the irrigation control assembly 410 and the remaining switches control specific outputs while in manual mode.

The depicted communications module 450 includes a transmission control protocol (TCP) stack 480 that enables the communication module 450 to establish a connection with the browser-equipped client 320 and exchange streams of data. The TCP stack 480 provides delivery of data to the serving module 430 and also orders incoming packets such that they are delivered in the same order in which they were sent. In one embodiment, the communications module 450 includes a capability to configure the network connection using dynamic host configuration protocol (DHCP), permitting the controller to automatically configure the internet protocol (IP) address. In another embodiment, the communications module 450 uses a saved IP address to initialize the network port.

The serving module 430 includes an embedded web server that communicates one or more web pages 440 to a browser-equipped client 320. A web page 440 may contain one or more fields that may be modified through interaction with the client 320. The scheduling module 420 may change the event schedule 460 in response to a change in the one or more web page 440 modifiable fields. Additionally, the serving module 430 may include a plurality of servers such as a hypertext transfer protocol (HTTP) server, a file transfer protocol (FTP) server, a secure hyper-text transfer protocol (SHTTP) server, a post office protocol (POP) server, and a user datagram protocol (UDP) server.

In one embodiment, the clock module 470 may query a time server 380 that provides highly accurate time values based upon an instrument such as an atomic clock in order to update the current time. In one embodiment, the scheduling module 420 may query a weather server 390 to obtain a variety of weather parameters such as temperature, humidity, wind direction, wind velocity, and the like. In response to the weather parameters the scheduling module 420 may modify the event schedule 460.

In one embodiment, the scheduling module 420 may query another controller 330 on the network, the controller being identified as a master controller. The scheduling module 420 may query the master controller using internet protocols supported by the communications module 450 in order to obtain one or more elements of a master event schedule and modify the event schedule 460. For example, if client 330 changes the master event schedule located in the master controller to conform to a new watering schedule, one or more slave controllers may obtain the revised master event schedule within a few minutes and make appropriate changes to the event schedule 460 located in the slave controller. Coordinated operation between a master and slave controllers simplifies management of multiple irrigation zones spread across a plurality of irrigation controllers.

Figure 5:
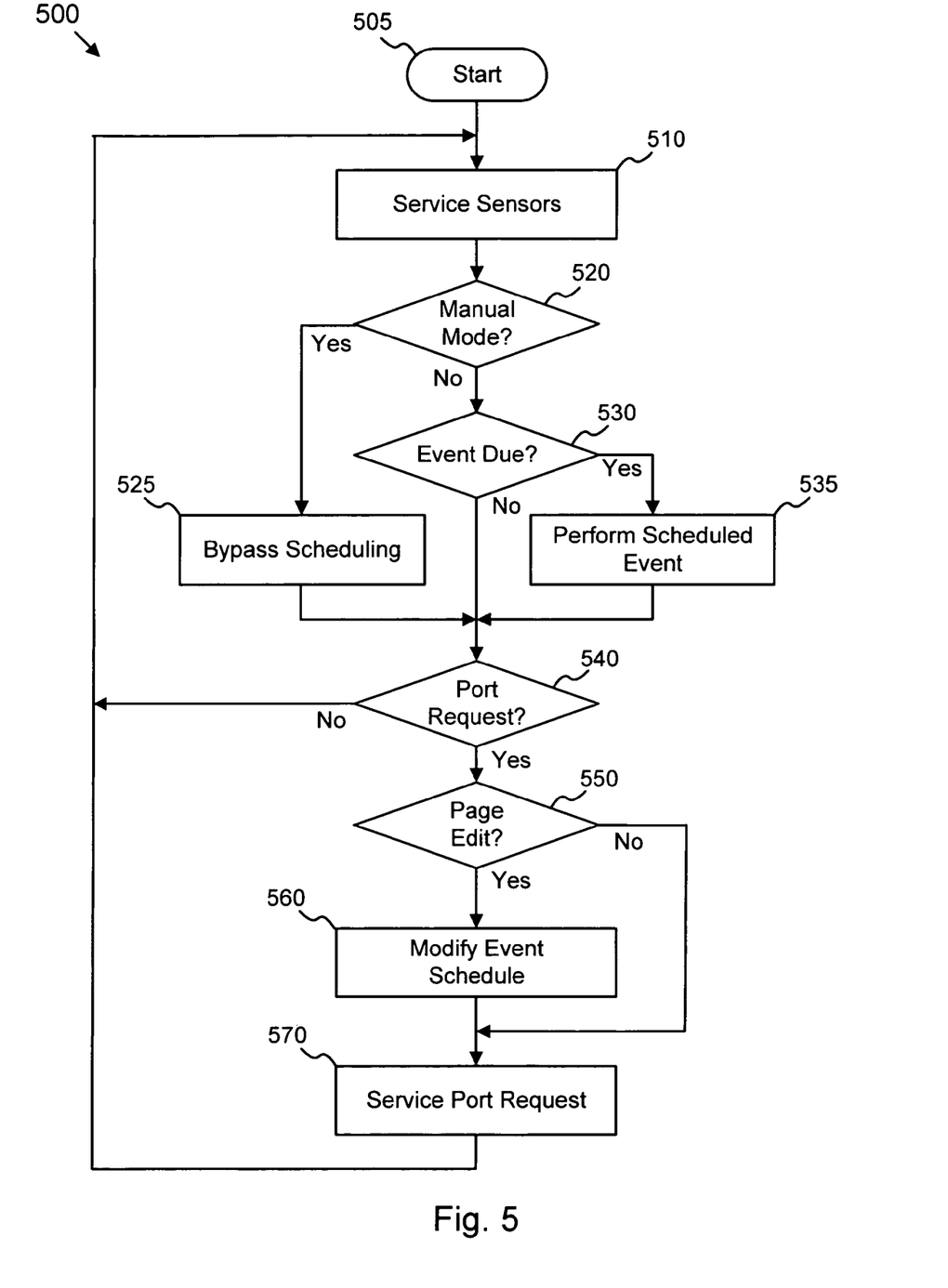
FIG. 5 is a flow chart diagram illustrating one embodiment of an irrigation control method of the present invention.

FIG. 5 is a flow chart diagram illustrating one embodiment of an irrigation control method 500 of the present invention. The irrigation control method 500 may be invoked 505 in response to activation of an on/off switch or the like. Subsequently, the method services 510 any sensors 140 connected to the controller by reading the sensors 140. In one embodiment, the sensor values are collected by the scheduling module 420 (via the device interface module 490), which in turn may modify the event schedule 460 in response to the sensor values. For example, in response to a temperature sensor exceeding a certain value, the scheduling module 420 may immediately schedule a watering cycle for a particular zone.

Subsequently, the method 500 determines 520 if the controller has been set to a manual mode. In one embodiment, the manual mode is activated via a switch on the controller assembly. If the controller has been set to manual mode, the method bypasses 525 the scheduling and directly controls the external devices as directed by the manual switches 495. In one embodiment, bypassing occurs in hardware. In another embodiment, bypassing is conducted in software by reading the switches 495 and setting the outputs of the interface module 495 as indicated by the switches 495. After the bypass step is completed, the method advances to port request test 540.

If the controller has not been set to manual mode, the method 500 determines 530 if one or more events are due for execution. In one embodiment, determining if an event is due involves comparing the current time with one or more event times in the event schedule 460. If an event is due for execution, the method performs 535 the scheduled event such as activating or deactivating one or more irrigation devices or similar devices such as relays 360, an X10 devices 370, or thermostats 395.

After performing the scheduled events or if there is no pending event, the method determines 540 if a network port request is pending. If a port request is not pending, the depicted method 500 loops to step 510 and continues along the main processing loop. If a port request is pending, the method determines 550 if the port request involves an edit to a web page previously served to a client. If a web page was edited, the method modifies 560 the event schedule 460 in response to the web page edits.

After modifying the event schedule or if the port request does not involve a page edit, the depicted method services 570 the port request. After the port request is serviced, the method 500 loops to step 510 and continues processing. As depicted, the method 500 continues indefinitely while the controller assembly has power.

The present invention provides improved functionality and versatility over prior art irrigation control systems and methods. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling irrigation devices, the apparatus comprising:

a scheduling module configured to activate at least one irrigation device in accordance with an event schedule;

a non-volatile memory configured to store at least one web page, the at least one web page configured to enable a change to the event schedule;

a serving module configured to serve the at least one web page to a browser-equipped client via a network;

the scheduling module further configured to change the event schedule in response to client interaction with the at least one web page; and wherein the scheduling module, non-volatile memory, and the serving module are integrated within a remotely programmable controller capable of controlling a plurality of irrigation devices.

2. The apparatus of claim 1, wherein the scheduling module is further configured to change the event schedule in response to a sensor value.

3. The apparatus of claim 2, wherein the scheduling module is further configured to log a sensor value.

4. The apparatus of claim 1, further comprising a communications module configured to connect the remotely programmable controller to the Internet such that the remotely programmable controller is a continuously active Internet node.

5. The apparatus of claim 4, wherein the communications module is configured to communicate using a network protocol selected from the group consisting of TCP, HTTP, FTP, UDP, and POP3.

6. The apparatus of claim 4, wherein the communications module is further configured to prevent data interchange with an unauthorized client.

7. The apparatus of claim 4, wherein the communications module further comprises a transmission control program Internet protocol (TCP/IP) stack.

8. The apparatus of claim 1, wherein the network is selected from the group consisting of a wireless network, an Ethernet network, and a power line network.

9. The apparatus of claim 1, wherein the scheduling module is further configured to query a time server.

10. The apparatus of claim 1, wherein the scheduling module is further configured to determine a sunset time.

11. The apparatus of claim 1, wherein the scheduling module is further configured to query a weather server.

12. The apparatus of claim 1, wherein the scheduling module is further configured to coordinate with a master controller.

13. The apparatus of claim 1, wherein the communications module is further configured to communicate using an email message.

14. The apparatus of claim 1, wherein the browser-equipped client is selected from the group consisting of a cell phone, a Personal Digital Assistant (PDA), a laptop computer, a web-enabled television, and a desktop computer.

15. The apparatus of claim 1, further comprising an interface module configured to activate at least one high voltage relay.

16. The apparatus of claim 15, wherein the device interface module is X10 compliant.

17. The apparatus of claim 15, wherein the interface module is further configured to control at least one thermostat.

18. The apparatus of claim 1, further comprising a sensor selected from the group consisting of a moisture sensor, a pressure sensor, a breaking glass sensor, a temperature sensor, a humidity sensor, a liquid level sensor, a voltage sensor, and a photo sensor.

19. A system for controlling irrigation devices, the system comprising:
- a network configured to enable communication between a browser-enabled client and at least one programmable controller;
- at least one remotely programmable controller comprising:
  - a non-volatile memory configured to store at least one web page,
  - a serving module configured to serve the at least one web page to the browser-equipped client via the network, and
  - a scheduling module configured to store a event schedule, activate at least one irrigation device in accordance with an event schedule, and change the event schedule in response to the client interaction with the at least one web page; and
- at least one irrigation device configured to supply water to one or more watering locations.

20. The system of claim 19, further comprising at least one sensor.

21. The system of claim 19, wherein the network comprises the Internet.

22. The system of claim 19, wherein the programmable controller further comprises a communications module configured to connect the programmable controller to the Internet such that the programmable controller is a continuously active Internet node.

23. The system of claim 22, wherein the communications module is further configured to prevent data interchange with an unauthorized client.

24. The system of claim 23, wherein the browser-equipped client is selected from the group consisting of a cell phone, a personal digital assistant (PDA), a laptop computer, a web-enabled television, and a desktop computer.

25. The system of claim 19, wherein the scheduling module is further configured to determine a sunset time.

26. The system of claim 19, wherein the scheduling module is further configured to query a weather server.

27. The system of claim 19, wherein the scheduling module is further configured to coordinate with a master controller.

28. The system of claim 19, wherein the network is selected from the group consisting of a wireless network, a telephone network, an Ethernet network, and a power line network bridge.

29. A method for controlling irrigation devices, the method comprising:
- activating at least one irrigation device in accordance with a event schedule;
- serving at least one web page using an embedded server configured to enable a browser-equipped client to change the event schedule;
- changing the event schedule in response to a client interaction with the at least one web page; and
- wherein activating at least one irrigation device, serving at least one web page, and changing the event schedule are conducted by a remotely programmable controller capable of controlling a plurality of irrigation devices.

30. The method of claim 29, further comprising reading at least one sensor and changing the event schedule in response to the sensor value.

31. The method of claim 29, further comprising connecting to the Internet as a continuously active Internet node.

32. The method of claim 29, further comprising preventing data interchange with an unauthorized client.

33. The method of claim 29, further comprising interrogating a time server.

34. The method of claim 29, further comprising determining a sunset time.

35. The method of claim 29, further comprising interrogating a weather server.

36. The method of claim 29, further comprising coordinating with a master controller.

37. An apparatus for controlling irrigation devices, the apparatus comprising:
- means for activating at least one irrigation device in accordance with a event schedule;
- means for serving at least one web page using an embedded server configured to enable a browser-equipped client to change the event schedule;
- means for changing the event schedule in response to a client interaction with the at least one web page; and
- wherein the means for activating, serving, and changing the event schedule comprise a remotely programmable controller capable of controlling a plurality of irrigation devices.

* * * * *